J. W. WOOD.
SPRING-BACKS FOR WAGON-SEATS.

No. 186,394. Patented Jan. 16, 1877.

WITNESSES:
Geo. H. Graham
J. H. Scarborough

INVENTOR:
J. W. Wood
BY
ATTORNEYS.

N. PETERS, PHOTO-LITHOGRAPHER, WASHINGTON, D. C.

UNITED STATES PATENT OFFICE.

JOHN W. WOOD, OF OWATONNA, MINNESOTA, ASSIGNOR TO HIMSELF AND C. SCHOEN, OF SAME PLACE.

IMPROVEMENT IN SPRING-BACKS FOR WAGON-SEATS.

Specification forming part of Letters Patent No. 186,394, dated January 16, 1877; application filed November 11, 1876.

*To all whom it may concern:*

Figure 1:
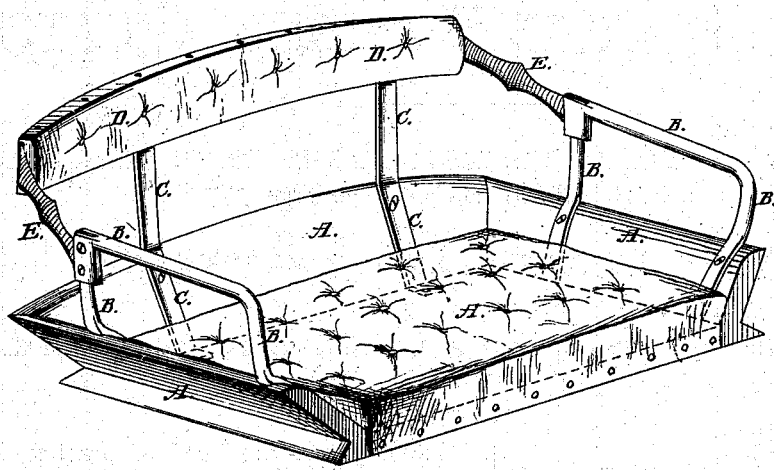
Figure 2:
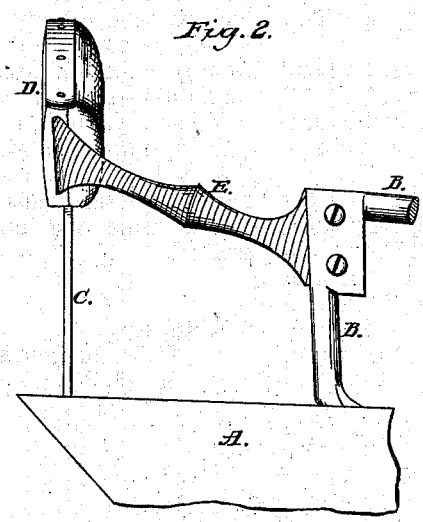

Be it known that I, JOHN W. WOOD, of Owatonna, Steele county, Minnesota, have invented an Improvement in Springs for Connecting the Back of a Wagon-Seat with the Arms, of which the following is a specification:

Figure 1 is a perspective, and Fig. 2 an end view.

The invention will first be described in connection with the drawing, and then pointed out in the claim.

A represents the seat; B, the arms; C, the vertical spring-plates; and D the lazy-back.

The back and arms have hitherto been connected by a curved plate spring, or the arm itself has been made in the shape of a coiled plate spring, or the arm has been made movable, being held by a surrounding coiled spring.

These springs are found in practice to be often fractured in frosty weather by a sudden jar; and in order to avoid this, as well as to make a cheaper spring, I construct this connection E of rubber, making it flat at each end, so that it may be readily fastened between plates at the arm and back, and preferably make it stouter in the middle, to lessen its liability to break at that point.

What I claim as new is—

In spring-backs for the seats of vehicles, the rubber connection or tension-spring E, having flattened ends clamped between plates to the arms and back, as shown and described.

JOHN W. WOOD.

Witnesses:
H. E. JOHNSON,
W. H. WEBSTER.